United States Patent Office 3,444,110
Patented May 13, 1969

3,444,110
POLYMERIC COLOR FORMERS AND PROCESS OF PREPARING SAME
George Alexander Dawson, Cranbury, N.J., assignor to E. I. du Pont de Nemours and Company, Wilmington, Del., a corporation of Delaware
No Drawing. Original application Sept. 23, 1964, Ser. No. 398,738, now Patent No. 3,370,952. Divided and this application Dec. 7, 1967, Ser. No. 688,678
Int. Cl. G03d 1/72; C08h 1/00
U.S. Cl. 260—8          4 Claims

ABSTRACT OF THE DISCLOSURE

Process for making polymeric color formers by polymerizing at 25° C.–90° C. a mixture of
(1) aqueous gelatin,
(2) an addition polymerizable monomeric color former containing an active color former nucleus capable of forming quinoneimine or azomethine dye, and
(3) an addition polymerizable vinyl compound that is liquid at 50° C.,
and the color formers resulting from the process. The color formers have gelatin-like characteristics and are non-migratory, free of haze, form tough elastic layers and have a low coefficient of friction.

---

This application is a division of prior application Ser. No. 398,738 filed Sept. 23, 1964, entitled Color Formers now patent number 3,370,952.

This invention relates to a new class of non-migratory polymeric color-formers and to photographic silver halide emulsions containing these color-formers.

It has long been recognized that, in multilayer, color photographic films, it is necessary that the various color-forming compounds in the separate layers should, desirably, be made as non-migratory as possible in order to minimize color contamination and to reproduce the color balance of the original subject as accurately as possible. Various methods of achieving this objective have been employed, e.g., the use of polymeric color-formers, color-formers with attached long-chain alkyl radicals, mordanting techniques, etc. Among the problems that have arisen have been inadequate non-migratory properties of the color-former, incompatibility with the gelatin binder, and lack of flexibility of the elements.

An object of the present invention is to provide a new class of color-forming polymeric materials which have excellent non-migratory properties. A further object is to provide such color-formers which are compatible with gelatin, which are water-soluble or water-dispersible and which are suitable for use as all or part of the binder in a photographic silver halide emulsion. Still another object is to provide color-forming polymeric materials from which photographic coatings and elements having excellent flexibility may be prepared. Still further objects will be apparent from the following detailed description of invention.

The color-forming materials of the present invention are water-soluble or water-dispersible film-forming polymers prepared by a process which comprises polymerizing by heating to a temperature of 25° C. to 90° C. for a period of 1 to 36 hours, a mixture comprising (1) aqueous gelatin;
(2) an addition polymerizable monomeric color former of the formula:

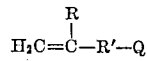

where R is a member selected from the group consisting of hydrogen; alkyl of 1–4 carbon atoms; chlorine and bromine; R' is a divalent organic radical and Q is an active color former nucleus capable of forming upon chromogenic development of exposed silver halide images with a primary aromatic amine color-developing agent, a dye selected from the group consisting of quinoneimine and azomethine dyes, said nucleus, in an enol form, having the formula:

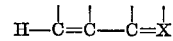

wherein

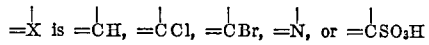

dissolved in
(3) an addition polymerizable vinyl compound that is liquid at 50° C.,
the gelatin, monomeric color former and polymerizable non-color forming monomer being present in parts by weight of 10 to 90, 3 to 75, and 2 to 60, respectively.

The foregoing active color forming nuclei are found in the reactive methylene dye intermediates and in aromatic hydroxyl compounds and include the reactive ethenol groups. These groups occur in phenols, naphthols, acyl-acetamides, cyanoacetals, betaketo esters, pyrazolones, homophthalimides, coumaranones, indoxyls, thioindoxyls, and indazolones.

The invention is also concerned with photographic silver halide emulsions wherein the gelatin-compatible color-forming polymeric material comprises at least 50% by weight of the silver halide binder.

An important class of suitable monomeric color-formers are disclosed in Firestine, U.S. 2,976,294, issued Mar. 21, 1961, wherein the divalent radical R', represents the amido group —CO—NH—. In this patent, it is disclosed that Q is an organic radical which contains an acyclic or intracyclic active methylene group, the active methylene group (—CH₂—) being rendered mobile by the proximity of certain activating groups, for example,

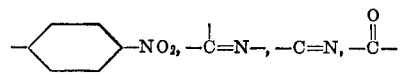

and others.

The —CH₂— group is usually present between two such groups in a cyclic or acylic system. It should be noted that that formula above for Q is written in the enol form wherein the active methylene group has the structure =CH—. Suitable monomeric color-formers are also disclosed in assignee's co-pending application of Umberger, Ser. No. 113,101, filed May 29, 1961. The monomers disclosed in this application are vinyl ether monomers of the formula

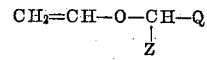

wherein Z is hydrogen or methyl. Yet another class of suitable color-forming monomers are disclosed in Firestine et al., Patent 3,163,625, Dec. 29, 1964 (U.S. Ser. No. 21,959, filed Apr. 13, 1960), wherein there are disclosed monomers of the structure

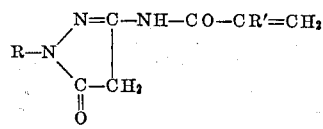

wherein R is an aromatic hydrocarbon radical or an organic radical of aromatic hydrocarbon character and R' is a member selected from the group consisting of hydrogen, alkyl of 1–4 carbon atoms, and chlorine.
The suitable non-color-forming monomers are those which will copolymerize efficiently with the color-forming monomers in the presence of gelatin and, also, act as liquid solvents for the color-forming monomer. These include essentially any readily available vinyl monomers, the preferred compounds being those which are the best solvents for the color-forming monomer. The invention is operable even when the vinyl monomer will dissolve only a limited amount of the color-former. The better the solvent action of the non-color-forming monomer, the less is required and, therefore, the more concentrated in color-former is the polymer which is formed. Particularly useful non-color-forming monomers are the low melting, non-ionized, synthetic vinyl monomers such as the alkyl acrylates and alkyl alkacrylates (e.g., alkyl methacrylates) where alkyl represents radicals of 1 to 8 carbon atoms. Other useful monomers are the vinyl esters such as acetate, propionate, etc., vinyl and vinylidene halides such as vinylidene chloride, styrene and substituted styrenes, the dienes such as the pentadienes, hexadienes, etc., acrylonitrile, methacrylonitrile, and the like.

In carrying out the polymerization reaction it is desirable to use free radical initiators such as bis azo initiators or redox initiator systems. Suitable bis azo initiators include:

1. $(CH_3)_2C(CN) \cdot N:N \cdot C(CH_3)_2 \cdot CN$

2. 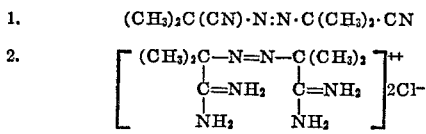

Suitable redox initiator systems include ammonium, sodium, or potassium persulfate in combination with sodium metabisulfite, sodium sulfite, sodium thiosulfate, or sodium phosphite.

Also, it is desirable, to employ a surfactant during the polymeriztion reaction. Anionic surfactants are preferred, especially sodium lauryl sulfate. Other useful anionic surfactants include dodecylbenzene sulfonic acid, naphthalenesulfonic acid condensed into a polyanion with formaldehyde, sodium isopropylnaphthalene sulfonic acid and sodium dioctylsulfosuccinate. Useful amphoteric surfactants are those disclosed in Nottorf, U.S. Patent No. 3,142,568, July 28, 1964 (e.g., alkylimino-dicarboxylates), as well as other amphoteric compounds such as betaine (e.g., C-cetyl betaine, taurines, glycines, etc.).

The color forming modified gelatins are particularly useful in multilayer color films such as described in Chu et al., U.S.P. 3,211,552, Oct. 12, 1965 (Ser. No. 113,100, filed May 29, 1961). The thin layers described therein are particularly advantageous in obtaining high definition images. These color-forming modified gelatins may be used in any or all of the record layers of such multilayer films and may serve as the sole silver halide binder or may be mixed in various proportions with gelatin or other compatible binding materials. For example, it may be desirable to use cyan color-forming modified gelatin as the only color-former in the red record layer but to use magenta and yellow color-forming polymers such as described in U.S. Ser. No. 113,100 above in the green and blue record layers of a multilayer color photographic film.

The multilayer color films of this invention are processed in a conventional manner. Colors are formed by development with an oxidized color developer, e.g., an aqueous alkaline developer solution of the type disclosed in Example I of Jennings, U.S. Pat. 2,397,865, Apr. 2, 1946. However, any of the other color-developing agents described in said Jennings patent can be used.

The invention will be further illustrated by but is not intended to be limited to the following examples.

EXAMPLE I

A cyan color-forming modified gelatin was prepared according to the following procedure. The parts by weight of starting materials were gelatin/color-former-monomer/methyl acrylate=75/8/17.

| Materials | Amount, g. |
|---|---|
| Gelatin | 225 |
| 1-hydroxy-N-(β-vinyloxyethyl)-naphthamide (cyan color-former monomer) | 24 |
| Ethyl acrylate | 51 |
| Sodium lauryl sulfate (30% by weight aqueous solution) | 150 |
| Ammonium persulfate | 6 |
| Sodium metabisulfite | 3 |
| Distilled Water | 2700 |

The gelatin was dissolved in 2000 ml. of water in a reaction flask from which air had been purged with nitrogen. After adding sodium lauryl sulfate, the solution was stirred for several minutes and then heated to 60° C.

The cyan color-forming monomer was dissolved in the ethyl acrylate at 50° C. and the solution charged to the reaction flask.

The ammonium persulfate and the sodium metabisulfite were then dissolved in separate portions of the balance of the water and added to the reaction mixture. Polymerization began as soon as the catalyst solutions were added and was completed by heating the reaction for 3–4 hours at 60° C. The product was a tan colored viscous liquid that set to a gel at room temperature. It was soluble in warm water in all proportions.

The product had a yield of 3,225 g., a percent solids of 10.85, a pH of 4.90, and a viscosity at 40° C. of 130 cps. This product was used as part of the binder of a silver halide photographic emulsion. After coating on a support, exposing to light in a camera and developing in a color-developer (para-amino diethyl aniline hydrochloride), a cyan colored image of good saturation and good resolution was obtained. The film had a high gloss and was free of haze.

EXAMPLE II

Another cyan color-forming modified gelatin was prepared using a ratio by weight of starting materials such that gelatin/color-former monomer/ethyl acrylate= 75/8/17.

| Materials | Amount, g. |
|---|---|
| Gelatin | 75 |
| Ethyl acrylate | 17 |
| 1-hydroxy-N-(β-vinyloxyethyl)-naphthamide | 8 |
| Azobisisobutyronitrile | 1 |
| Sodium lauryl sulfate (30% by weight aqueous solution) | 50 |
| Distilled Water | 900 |

The polymerization was conducted under a nitrogen atmosphere in a two liter reaction flask. The gelatin was soaked for 15 minutes in 800 ml. of cold distilled water in the reaction flask and then stirred to solution at 60° C. Air was displaced from the flask by a steady stream of nitrogen.

The color-former monomer was pulverized finely and dispersed in a solution of the sodium lauryl sulfate in 50 ml. of water. This dispersion was added to the gelatin solution in the reaction flask while stirring. The initiator, azobisisobutyronitrile, was dissolved in the deinhibited ethyl acrylate and this solution was charged to the reaction flask. The reaction mixture was stirred for 24 hours at a temperature of 60°–80° C. while nitrogen was used as a constant purge. During this period the course of polymerization was observed by the change in appearance of the reaction mixture from a cream colored, opaque dispersion at the beginning to a bluish white, translucent, viscous solution at the end. On cooling, the solution set up as a firm gel.

This product was found to possess 11.7% by weight solids. It was diluted to a 5% solids solution with water and coated on a polyester film base as described in Example IV of U.S. Patent 2,779,684. It dried to a clear layer having good anchorage to the film base. When a sample of coated base was immersed in a solution of a para amino diethylaniline color developer to which a few crystals of potassium ferricyanide had been added a brilliant cyan color developer in 10–12 seconds.

EXAMPLE III

A cyan color-forming modified gelatin was prepared using a ratio by weights of starting materials such that gelatin/color-former monomer/acrylonitrile=75/8/17.

| Materials: | Amount |
|---|---|
| Gelatin | g-- 75 |
| 1-hydroxy-N-($\beta$-vinyloxyethyl)-naphthamide | g-- 8 |
| Acrylonitrile | g-- 17 |
| Sodium lauryl sulfate (30% by weight aqueous solution) | g-- 50 |
| Ammonium persulfate | g-- 2 |
| Sodium metabisulfite | g-- 1 |
| Distilled water | ml-- 900 |

The reaction was carried out in a 3 liter flask in an atmosphere of nitrogen.

The gelatin was soaked for 15 min. in 830 ml. of cold distilled water and then stirred and heated to solution at 40° C. Then the sodium lauryl sulfate was diluted with 50 ml. distilled water and added to the gelatin solution. The color-former monomer was dissolved in the acrylonitrile at 40° C. and added to the reaction mixture, followed by additions of the ammonium persulfate and the metabisulfite. The reaction mixture was heated 20 hours at 40–50° C. and the product was obtained as a turbid solution that formed a gel on cooling to room temperature. The solids content was 9.8% by weight.

A solution, diluted with distilled water to a solids content of five percent, dried down to a frosty layer when coated on the film base of Example II. The coating developed to a cyan color when immersed in an oxidized solution of the photographic color developer, para-aminodiethylaniline.

EXAMPLE IV

A cyan color-forming modified gelatin was prepared using a ratio by weights of starting materials such that gelatin/color-former monomer/butylacrylate=43/14/43.

| Materials: | Amount, g. |
|---|---|
| Gelatin | 75 |
| 1-hydroxy-N-($\beta$-vinyloxyethyl)-naphthamide | 25 |
| N-butyl acrylate | 75 |
| 30% by weight aqueous solution of sodium lauryl sulfate | 50 |
| Azobisisobutyramidine hydrochloride | 1 |
| Distilled water | 825 |

The reaction was carried out in a 2-liter glass reaction flask in an atmosphere of nitrogen. Seventy-five grams of gelatin was soaked 15 min. in 800 ml. of cold distilled water in the reaction flask and then warmed with stirring to 40° C. During this time the flask was purged with nitrogen gas. After solution was complete, the sodium lauryl sulfate was added to the flask while rinsing it with 25 ml. of distilled water.

The cyan color-former was dissolved in the butyl acrylate at 40–50° C. and this solution was also charged to the flask, along with the azobisisobutyramidine hydrochloride which was dissolved in 25 ml. water.

Polymerization was accomplished by heating the reaction mixture while stirring to 70° C. at which temperature an exothermic reaction took place, raising the temperature to 82° C. for several minutes. The temperature was then maintained for 4½ hours at 75° C. to assure completion. The product was a translucent gel with a bluish-white color (other times the product has been made with a pinkish color) and was found by analysis to have 17.0% solids. A solution of the product was prepared by diluting with water to 5% solids and the solution was coated on a polyester film base. The dried coating gave an intense (blue) color when immersed 3–4 minutes in a photographic color developer solution containing several crystals of potassium ferricyanide.

EXAMPLE V

A yellow color-forming modified gelatin was prepared using a ratio by weights of starting materials such that gelatin/color-former monomer/ethyl acrylate=75/8/17.

| Materials: | Amount |
|---|---|
| Gelatin | g-- 225 |
| p-Methacrylamidobenzoylacetanilid | g-- 24 |
| Ethyl acrylate | g-- 51 |
| Sodium lauryl sulfate (30% by weight aqueous solution) | g-- 150 |
| Sodium metabisulphite | g-- 3 |
| Ammonium persulphate | g-- 6 |
| Distilled water | ml-- 2700 |

The polymerization was conducted in a 5-liter reaction flask in an atmosphere of nitrogen in accordance with the following procedure.

The gelatin was soaked in 2000 ml. of water in a 5-liter reaction flask for 15 minutes. The air was purged by maintaining a steady flow of nitrogen throughout the reaction period. At the end of the soaking period the agitator was started and the mixture was warmed to 40° C. to effect solution. The sodium lauryl sulfate, diluted with 200 ml. H$_2$O, was added and rinsed with 100 ml. of water.

Next were added the ammonium persulphate and the sodium metabisulfite, each dissolved in 100 ml. of water. The yellow color-former monomer, dissolved in the ethyl acrylate at 50° C., was next added to the reaction vessel. Finally, the persulfate and metabisulfite solutions were added and each was rinsed with 100 ml. of water. The temperature of the reaction mixture was raised to 60° C. and held at that temperature ±2° C. for 3 hours. The product obtained was a yellow gelatinous compound which was coated, after dilution with water to 5% solids, on the film base of Example II, to give a colorless transparent layer. When a sample of base so coated was immersed for 3 minutes in a photographic color developer solution, to which had been added a few crystals of potassium ferricyanide, a yellow color was developed.

EXAMPLE VI

A magenta color-forming modified gelatin was prepared using a ratio by weights of starting materials such that gelatin/color-former monomer/ethyl acrylate= 75/8/17.

| Materials: | Amount |
|---|---|
| Gelatin | g-- 225 |
| 1-phenyl-3-methacrylamido-5-pyrazolone | g-- 24 |
| Ethyl acrylate | g-- 51 |
| Sodium lauryl sulfate (30% by weight aqueous solution) | g-- 150 |
| Ammonium persulphate | g-- 6 |
| Sodium metabisulfite | g-- 3 |
| Distilled water | ml-- 2700 |

This color-forming modified gelatin was prepared by the procedure used in Example V.

The product was a tan colored gelatinous material which could be coated as a 5% solids solution on the film base of Example II to give a clear transparent layer. This coating, when immersed for 3 minutes in a photographic color developer solution in which several crystals of potassium ferricyanide had been added, developed a deep magenta color.

EXAMPLE VII

A magenta color-forming modified gelatin was prepared using a ratio by weights of starting material such that gelatin/color-former monomer/ethyl acrylate= 75/8/17.

| Materials: | Amount, g. |
|---|---|
| Gelatin | 75 |
| 1-phenyl-3-methacrylamido-5-pyrazolone | 8 |
| Azobisisobutyronitrile | 1.0 |
| Ethyl acrylate | 17 |
| Sodium lauryl sulfate (30% by weight aqueous) | 50 |
| Distilled water | 849 |

The polymerization is carried out similar to the procedure described in Example II. The product was a clear, straw colored gelatinous material which was coated on the film base of Example II to give a clear layer. On development in an oxidized photographic color developer solution, a clear, intense magenta color was formed.

EXAMPLE VIII

A gelatino-silver halide emulsion, prepared for coating in the normal manner, was divided into two equal portions containing 0.033 mole of silver halide each. To one portion there was added 140 g. of the cyan color-forming modified gelatin described in Example II (a gel containing 11.7% solids prepared from starting materials having weight ratios of gelatin/cyan color-former monomer/ ethylacrylate=75/8/17). To the other portion, serving as control, there was added a cyan color-forming copolymer of maleic anhydride and 1-hydroxy-N-(beta-vinyloxyethyl)-2-napthamide, prepared as described in Example I of assignee's copending application of Umberger, Ser. No. 113,101 filed May 29, 1961. Gelatin was also added to the control emulsion to compensate for that which was present in the color-forming modified gelatin so that both emulsions had about the same final concentration of gelatin as well as cyan color-forming nuclei.

The two emulsions were coated on photographic film base, dried and processed as color-reversal films in the conventional manner. It was observed that the processed coating containing the modified gelatin had a very high surface gloss. Absorption curves of the developed dyes from the two coatings were compared in a Cary Recording Spectrophotometer Model 14MS, Serial 14 (Applied Physics Corp., Pasadena, Calif.), and no significant differences in absorption maxima were observed.

Relative brittleness (flexibility) values of the two films were compared, both with processed and unprocessed samples, by pulling the samples through a brittleness test wedge to determine cracking diameters. The procedure employed was that described in ASA Standard PH 1.31–1958. The following values of cracking diameters were then determined with diameters given in centimeters:

Film containing color-former modified gelatin:
  Processed _____ 0.21
  Unprocessed _____ 0.13
Control film:
  Processed _____ 0.43
  Unprocessed _____ 0.27

The smaller values of cracking diameter, of course, indicate greater flexibility.

EXAMPLE IX

An essentially identical coating of the gelatino-silver halide emulsion containing the cyan color forming modified gelatin of Example VIII was used as the first layer on a multilayer film element. Over this first layer on a suitable film base there were coated in succession:

(a) A separator layer comprised of a solution of bone gelatin containing saponin as a surfactant and chromealum as a hardener;

(b) A gelatino-silver bromo-iodide emulsion layer sensitive to blue and green light and containing a polyanion pyrazolone magenta color-former copolymer of the type shown in Firestine et al., U.S. Patent 3,163,625, Dec. 29, 1964 (U.S. Ser. No. 21,959 filed Apr. 13, 1960).

(c) A gelatin layer containing colloidal silver for absorbing blue light;

(d) A gelatino-silver bromo-iodide emulsion layer sensitive to blue light and containing a polyanion benzoylacetanilide yellow color-former prepared by transacetalization of low viscosity 99% hydrolyzed polyvinyl alcohol with m-benzoylacetamidobenzaldehyde ethylene glycol acetal and o-sulfobenzaldehyde in an ethanol-water reaction medium with p-toluenesulfonic acid as acetalization catalyst; and (e) A gelatin antiabrasion layer.

A sample of the completed multilayer film was exposed in a camera and processed by reversal with all solutions being at 70° F. The film was first developed in a conventional black and white, p-methylaminophenol hydroquinone developer, then treated in an acid shortstop bath, water washed, and re-exposed by flashing to white light. It was then color developed for 20 minutes in a solution containing ten grams per liter of the developing agent, 4-amino - N - ethyl-N(beta-methanesulfonamidoethyl)-m-toluidine sesquisulfate monohydrate, 40 grams per liter $Na_3PO_4 \cdot 12H_2O$, and 20 grams per liter anhydrous $Na_2SO_3$. Processing was continued with treatment in another acid shortstop bath, washing with water, bleaching, washing, fixing with sodium thiosulfate, washing and drying. A good positive multicolor transparency was obtained.

Although this invention is particularly applicable to negative and reversal color films which are designed for exposure in a camera, it is also useful in other color films which may have other than the conventional layer arrangements. The emulsions of this invention can be used advantageously in negative, positive or reversal color films which may be for cine or still use, in transparencies, prints for viewing by reflected light, intermediate films, etc.

The light-sensitive emulsion layers may be arranged with respect to the support in other manners and with other arrangements of spectral sensitivities and color-formers as is known in the art. Suitable other layer arrangements are disclosed in U.S. Patents 2,397,864, 2,927,019, 2,927,024 and 2,997,338.

The invention, moreover, is not limited to the specific light-sensitive materials described in the above detailed examples. Various other simple and mixed silver halides may be used as the light-sensitive materials in like manner. Mixtures of silver bromides, chlorides, and/or iodides can be made by adding mixtures of soluble salts of these halides in like manner. Other useful soluble halides include calcium bromide, potassium iodide, sodium and potassium chlorides and iodides, etc.

Inert ingredients, e.g., pigments, colloidal silver, matting agents, etc. may be present in all of the element layers including the support. The element may also contain chemical sensitizers, optical sensitizers, coating aids, antifoggants, non-halation dyes and pigments, brightening agents as known to the art, etc.

The color-forming modified gelatin may be used as the sole binder or may be used in combination with gelatin since it is compatible with gelatin in all proportions. The color-forming modified gelatin can also be used in combination with other natural or synthetic water-permeable organic colloid binding agents. Such agents include polyvinyl acetal of sodium o-sulfobenzaldehyde; various polysaccharides, e.g., dextran; the hydrophilic copolymers in Shacklett, U.S. Patents 2,846,411 and 2,834,758; polyvinyl pyrrolidone, and polymers of acrylamide and methacrylamide.

The emulsions can be coated on any suitable support, e.g., cellulose esters, cellulose mixed esters, superpolymers, e.g. poly(vinyl chloride co vinyl acetate), polyvinyl acetals, butyrals; polystyrene; polyamides, e.g., polyhexamethylene adipamide, polyesters, e.g., polycarbonates, polyethylene terephthalate, polyethylene terephthalate/isophthalate, esters formed by condensing terephthalic acid and its derivatives, e.g., dimethyl terephthalate with propylene glycol, diethylene glycol tetramethylene glycol, cyclohexane-1, 4-dimethanol (hexahydro-p-xylene dialcohol); paper, metal, glass, etc.

Elements made up of integral coupler emulsions obviously become more susceptible to interlayer color contamination (particularly the contamination due to migration of oxidized developer during the color development step) as the emulsion layers become thinner. It has been found that this color contamination can be effectively reduced by the addition of a competing coupler, e.g., phenols that form a soluble removable dye on coupling (such as citrazinic acid). In particular, it has been found that larger than normal concentrations of sodium sulfite in the color developer solutions are especially effective in combination with the color-former modified gelatin in reducing interlayer color contamination caused by migration of oxidized developer and by migration of color-former molecules.

In the case of integral color films, the color-forming modified gelatin is, of course, incorporated in the film element.

An advantage of the invention is that the color-forming modified gelatins have gelatin-like characteristics and may be easily incorporated into silver halide emulsions as total or partial replacements of gelatin. The color-former substituent is efficiently coupled by the color developer and there is some evidence to suggest that the color-forming modified gelatins are significantly more active in color development reactions than conventional color-formers. In multilayer color films it has been found that color contamination is at a remarkably low level due to the non-migratory nature of these novel color-formers. Also, the use of color-former modified gelatins leads to multilayer films which have reduced tendency to crack or break when used in cameras or projectors, i.e., the films are more flexible. Furthermore, such films have low curl, and they are tough and elastic even at low temperatures. Color film layers containing the materials of this invention are clear, free of haze and have a very high surface gloss. Because the silver halide grains of a color emulsion made with color-forming modified gelatin are uniformly and intimately surrounded by the color-forming groups, which have low light scattering effects, the colored image obtained is sharp and well defined. Another advantage is the low coefficient of friction of the films of this invention. Still additional advantages will be apparent from the above description of the invention.

The embodiments of the invention in which an exclusive property or priviledge is claimed or defined as follows:

1. A process for making polymeric color formers which comprises polymerizing by heating to a temperature of 25° C. to 90° C., a mixture comprising (1) aqueous gelatin;
(2) an addition polymerizable monomeric color former of the formula:

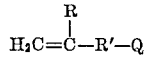

where R is a member selected from the group consisting of hydrogen; alkyl of 1–4 carbon atoms; chlorine and bromine; R' is a divalent organic radical and Q is an active color former nucleus capable of forming upon chromogenic development of exposed silver halide images with a primary aromatic amine color-developing agent, a dye selected from the group consisting of quinoneimine and azomethine dyes, said nucleus, in an enol form, having the formula:

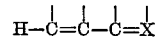

wherein

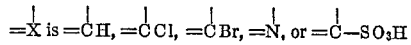

dissolved in
(3) an addition polymerizable vinyl compound that is liquid at 50° C., the gelatin, monomeric color former and polymerizable non-color forming monomer being present in parts by weight of 10 to 90, 3 to 75, and 2 to 60, respectively.

2. A process as set forth in claim 1 wherein the addition polymerizable non-color former is an alkyl acrylate wherein the alkyl radical contains 1 to 8 carbon atoms.

3. A process as set forth in claim 1 wherein the addition polymerizable non-color former is an alkyl methacrylate wherein the alkyl radical contains 1 to 8 carbon atoms.

4. The color formers obtained by the process of claim 1.

References Cited

UNITED STATES PATENTS

| 2,548,520 | 4/1951 | Damschroder et al. |
| 2,763,625 | 9/1956 | Illingsworth et al. |
| 2,956,884 | 10/1960 | Cardwell |
| 2,976,294 | 3/1961 | Firestine |
| 3,211,552 | 10/1965 | Chue |
| 3,070,442 | 12/1962 | Cohen et al. |

WILLIAM H. SHORT, *Primary Examiner.*

E. M. WOODBERRY, *Assistant Examinr.*

U.S. Cl. X.R.

96—114; 260—117